L. Van Hoesen.
Net Loom

N° 2,798.  Patented Oct. 7, 1842.

Inventor:
Levi V Hoesen

UNITED STATES PATENT OFFICE.

LEVI VAN HOESEN, OF NEW HAVEN, CONNECTICUT.

MACHINE FOR WEAVING FISH-NETS.

Specification of Letters Patent No. 2,798, dated October 7, 1842.

*To all whom it may concern:*

Be it known that I, LEVI VAN HOESEN, of the city and county of New Haven and State of Connecticut, have invented a new and useful Machine for Weaving Fish-Nets; and I do hereby declare the following to be a full, clear, and exact description thereof, reference being had to the accompanying drawings, making a part of this specification, in which—

Figure 1:
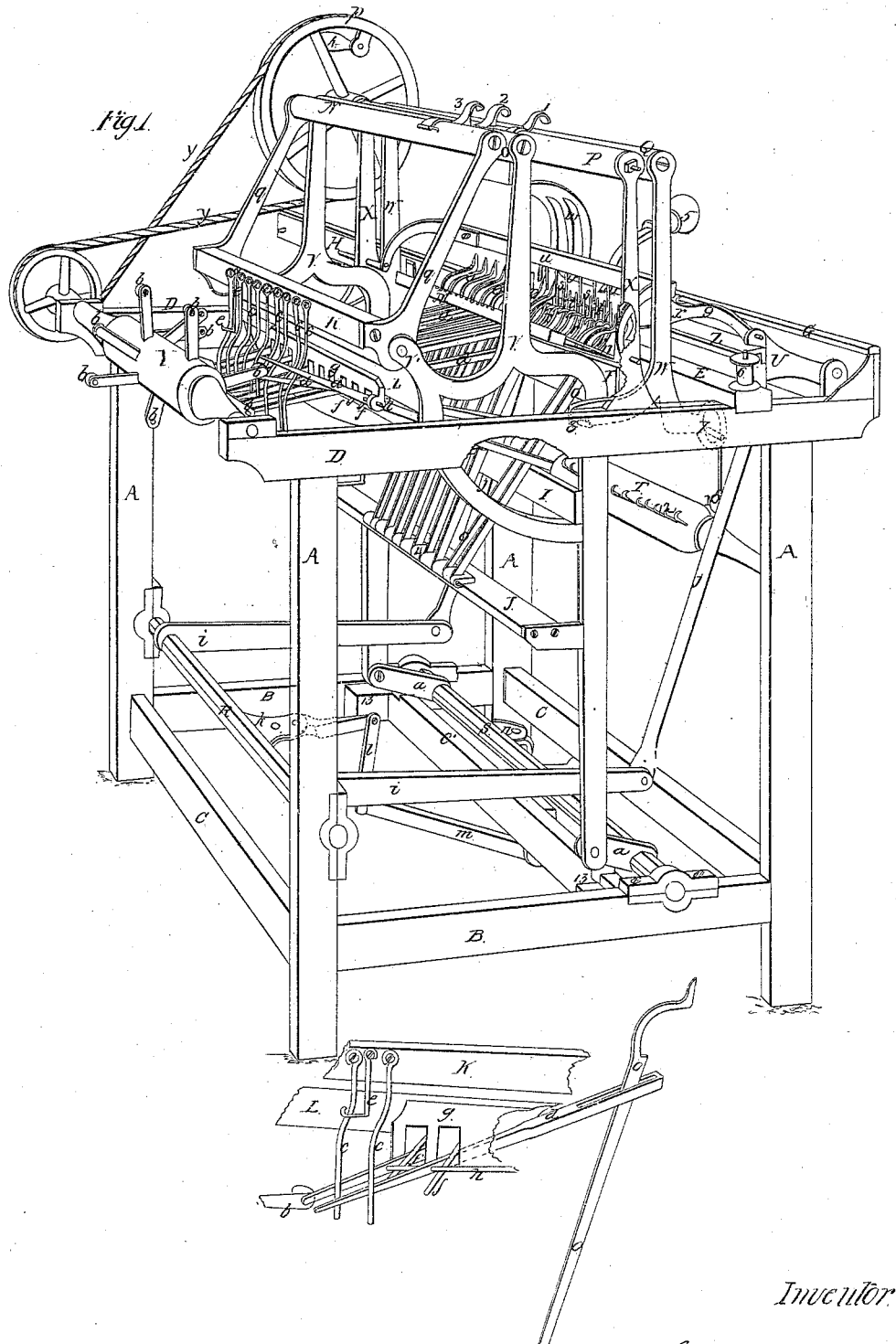
Figure 2:
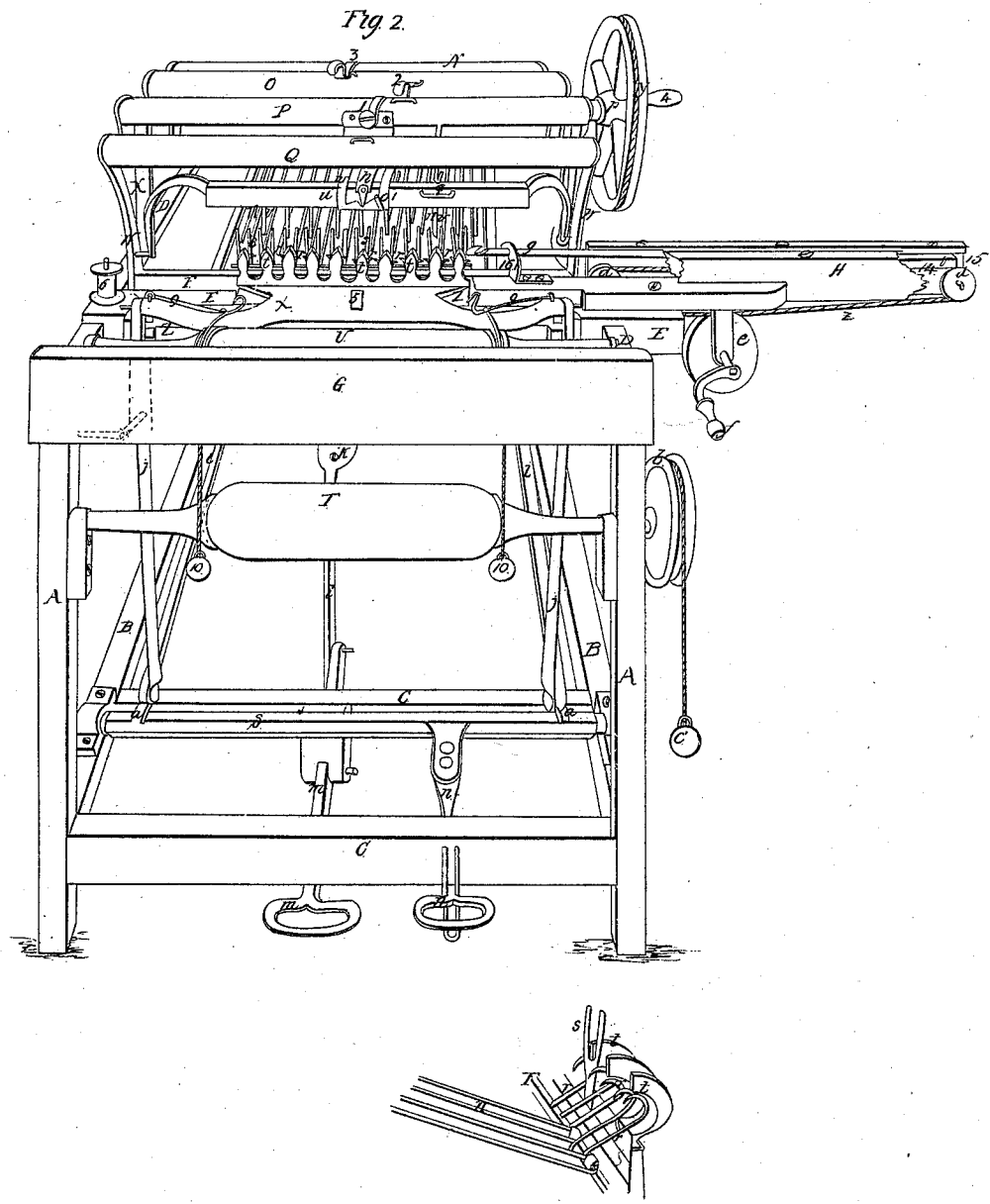
Figure 3:
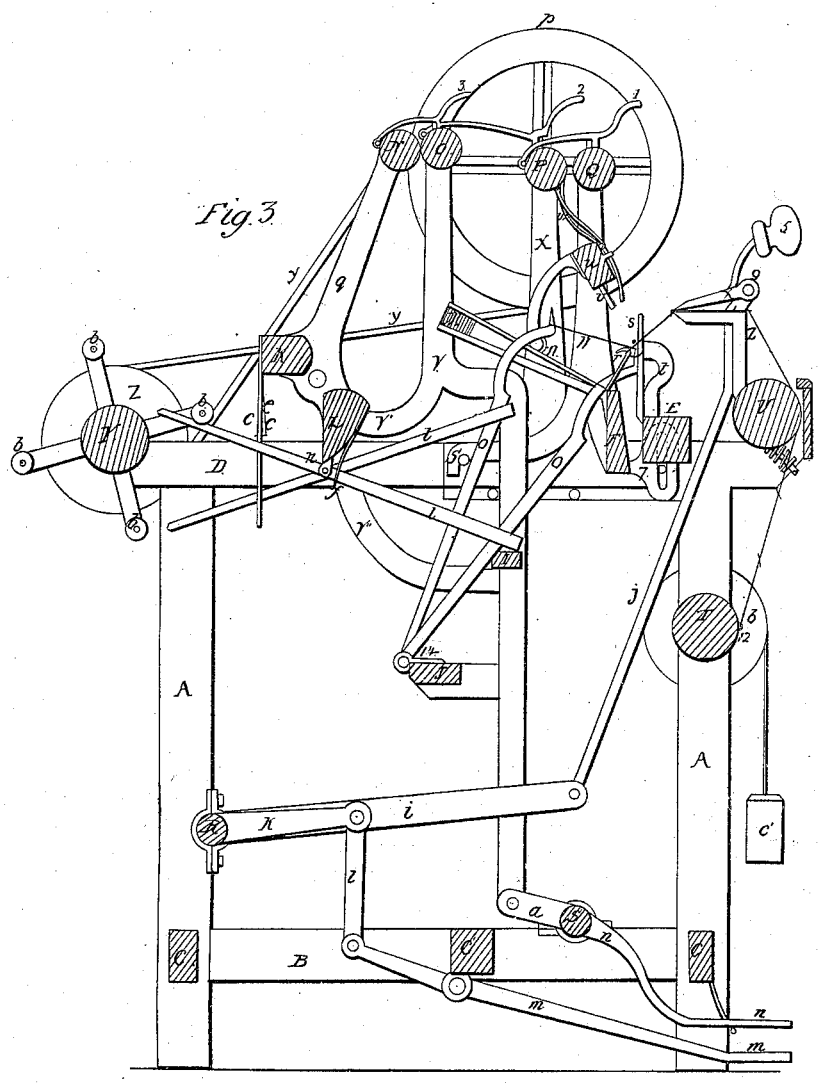

Figure 1 is a perspective side view, Fig. 2, a perspective view from the front, Fig. 3 a vertical section.

The nature of my invention consists in weaving fish nets, having flat square knots, and diamond shaped meshes, by means of machinery of the following construction.

The frame is composed of four upright posts A, connected by girts B, and C, and caps D, forming a common oblong frame, of suitable dimensions to contain the machinery—a cross beam E, is fastened to the caps near the front of the frame. To the back side of this beam, a plate of metal is screwed, from the upper edge of which project what I denominate "gums" ($t$), which are curved into a C form, the convex side projecting forward over the beam. The transverse section is a right line on the concave side, and rounding on the other, swelling out in the middle toward each other, and tapering off on the upper surface nearly to an edge; on the back of the plate are vertical ribs, into which teeth ($s$) are fastened, the shank of which is narrow, and extends up straight to the top of the gums, which tuck against them at this point. They are there forked, the two prongs extending up straight on each side. Directly before the gums, and parallel to them, are placed a pair of straight jaws ($x$ and $z$) which rest on the beam E, when they are not raised, to each end of the jaws, connecting rods ($j$, see Fig. 3) are fastened, that connect them with arms ($i$) extending out from a shaft R, which has its bearings in the rear post. Near the center of this shaft, there is another arm ($k$), coupled by a connecting bar ($l$) with a treadle ($m$), whose fulcrum is on a cross brace C', Fig. 3, extending from one of the girts B, to the other. This treadle projects in front of the frame, and, by bearing it down, the jaws are lifted above the gums. They are kept in contact with the gums by a rod (17) which bears against each of the connecting rods. These rods (17) pass through staples projecting from the frame, and are pressed back by spiral springs, which are coiled around them on the upper jaw ($x$) in a handle 5; the jaws are connected together at the ends. In front of the jaws a roller U, is placed, which is largest in the middle, tapering off toward the ends, for the purpose of spreading the net which passes over it.

Between the front posts a roller T is put, on one side of which is a row of hooks (12); to these the web is hitched; on the outer end of the shaft of this roller, is a large pulley ($b$ see Fig. 3), with a cord attached to, and wound around it; to which a weight ($c'$) is suspended, for keeping the web strained tight.

On the top of the beam E, is fastened a guide H, to the drawing rod ($g$). This guide has a pulley ($d$) at each end, (shown in Fig. 2, by the removal of part of the guide). There are grooves (15) in the sides of the guide, in which a block (14) slides; to which one end of the drawing rod is attached. A band (2) is attached by one end to the block, passes around one of the pulleys ($d$), and then around a pulley ($e$) suspended under the guide, which has a crank ($f$) attached to it; from thence it is carried around the other pulley ($d$), and its other end is fastened to the block (14). By this apparatus the drawing rod is moved; this is a straight piece of wire, having a hook on the end opposite the block; it runs across the machine, just in front of the teeth. There is a rest (16) placed near the web, through which the rod slides, and when it is drawn back, the hook brings the twine against the rest, and holds it fast. A perpendicular stationary iron post X is screwed to each of the cap pieces D, at about one third the distance from the front, the bottom part of which extends along some distance on the cap, on each side. These posts are connected at top by a bar P, and have studs or pivots (7 and 8) projecting from their lower part, for a purpose to be presently named.

Two uprights W, are connected by a cross bar Q, at their upper ends, and another bar F, near the bottom; they have each two projecting legs, nearly at right angles to the upright, in the ends of which are slots that receive the studs (7 and 8) above named, on which the uprights rest; so that the bar Q can be moved back and forth, resting the legs alternately, on one or other of the pivots. To the bar F, are attached a series of hooks (r), so formed, as that when the bar Q, is thrown forward, the hooks pass by the teeth, and enter the concavity of the gums, two hooks to each gum; their points turning out, and projecting a little beyond the side of the gum. There is also a series of guide wires (11) attached to the bar F, which project back and upward; the ends of these wires are fixed in a bar M, which is supported by braces from the bar F at each end.

The lathe is placed just back of the posts X, and consists of two upright swords V, which are bent backward horizontally at the part that is just above the frame, the end again rising perpendicularly from the angle, from which the upper part springs an arm V', extends backward, which is supported by a brace V'' curved, and joining the lower part of the sword below the cap; at a proper distance below this brace, a stud projects from the sword backward, to sustain a transverse horizontal bar J, that forms the fulcrum for the sweeps (o). These sweeps extend up from the bar J, (to which their ends are jointed) obliquely forward; they have a curve near their upper part, their ends being bent nearly at right angles to the adjoining part, and standing perpendicular, rest against the teeth. The swords of the lathe are connected above by a cross bar O, and near their middle, by another cross bar I, which rests on the brace V''. The lathe so constructed, is jointed by the lower ends of its swords to two arms (a), extending back from a shaft S, which has its bearings on the girths B, of the frame. From this shaft a treadle (n) extends forward beyond the frame, to raise the lathe when required. A frame is sustained on pivots, that turn in the arms V', this frame is formed of two L shaped side pieces the pivots being placed at the angle of the two longest arms; the side pieces are connected by a square bar K, just behind the pivots, and by another bar L, at the end of the longest horizontal arms; the upright arms are also joined by a bar N, nearly on a level with those marked O, P, Q, the bar L support the fulcrum of a series of levers (d) that are suspended on long journals so as to allow them to slide sidewise, as well as to turn on their fulcra. Each of the levers has an eye or slot in its forward end, through which the sweeps (o) are put; this end rests on the cross-bar I, of the lathe when not in action, inclining at an angle of about 30° the tails of these levers project beyond the bar K, a spring (f) is fastened to the bar L above each of the levers, which extends down beside them and presses them all to the right, except the first one, against the other side of which the spring is made to bear. By this arrangement all the levers but the first, stand in a position not to be struck by the cams hereafter described. To the bar K, a series of "cast wires" (c) are pivoted by their upper ends, these wires extend down perpendicularly to a point just below the levers when their rear ends are elevated; the wires resting against their right side; from this point they are bent at an angle of about 20° toward the right so as to pass under the lever next on that side; their lower ends are again turned down parallel with the upper part; the first of this series of wires rests against the second lever, and has a spring (e) to the left of it, that resists its further inclination in that direction, and serves to bring it back into place again after it has been acted on by the first lever as hereafter named.

Behind the ends of the levers (d) is a shaft Y, having its bearings on the top of the frame. A pulley (z) is placed on the right hand end of the shaft, which is turned by a cross band from a large pulley (p), that turns on a stud, projecting from the port X. This is driven by a crank 4. From the shaft Y a number of arms (b) project, (one for each lever) which are set spirally around it; on the outer end of each of the arms, grooved pulleys are put; these all move around between the levers, except the first, which stands on a line with the first lever, and forces it down. As the lever falls, it presses against the inclined part of the first cast wire, which bears the second lever far enough to the left to be caught by the second pulley, this in turn descending throws the third lever to the left, and so on to the end. As soon as the first pulley leaves the lever, the spring (e) above named acts on the cast wire and throws the lever to the right, so as not to be touched by the cam when it again comes around; the others are all thrown out of range when they are either up or down, by thin springs on the bar L. The bar N, has a hook (3) which confines it to the top bar O, of the lathe; from this bar there is a brace hook (2) to keep the latter off from the stationary bar P, to which bar a hook 1, is attached, for holding back the bar Q.

A transverse bar (u), having a row of teeth (v) projecting down from its under side, is supported on studs in the posts X, just under the bar Q by two curved arms, one at each end. This comb can be moved up and down, with the studs for a center, it also has a lateral motion by sliding on the studs. To the middle of the bar P, a plate (w) is affixed, which curves forward, concentric with the motion of the comb; this plate has a slot cut in it near each edge, and across the bottom. On the end of the center tongue thus formed, a pointer (h) is hung, that falls down over the opening across the plate at the bottom; a pin (o') is inserted into the front of the comb at the center, which plays in the slot above named; a hook (*q*) attached to the bar P, catches on the comb, and holds it up when not in action.

Before operating this machine loops are cast onto the teeth throughout the series, one loop embracing the two prongs in each of the spaces between the grooves, *i. e.*, one prong of each of the two adjacent teeth, as many in number, as the width of the net to be made; they then pass through between the jaws, and over the roller U, the web extending down to the roller T, where it is hitched on the hook (12). The web is drawn tight with any required force, regulated by the size of the weight (*c'*) acting on the pulley (*b*). By bringing the jaws down onto the bar E, the bight of the loops are drawn between the gums, and past the points of the hooks (*r*) which are brought forward into the concavity of the gums for that purpose, where the bight of each loop is caught onto the corresponding pair of hooks; the bar Q is pushed back, till it is caught by the hook (1) on the bar P; this draws the hooks back and upward, (in the position shown in Fig. 3). The jaws are then elevated by the treadle (*m*), bringing up the bight to the position shown in Fig. 3. This forms each loop into an open slip noose; the drawing rod (*g*) is then passed through the open nooses and the end of the twine (which is wound on a spool (*b*) standing on the frame) is hooked onto it, and drawn through, carrying the end of the twine against the rest (16) which holds it fast till the sweeps are drawn back to form the mesh; this is effected in the following way the treadle (*n*) is depressed, which raises the lathe to which the sweeps are attached, bringing the upper ends up between the teeth and the twine that has been drawn across by the rod (*g*), the cam shaft Y is then turned, bringing the first cam (*b*) to the right, into contact with the first lever, which it bears down, and draws back the sweep connected therewith, till the eye of the lever rises above the projection on the front of the sweep, which hold them both in that position; and the loop of twine the desired size for the mesh (in Fig. 3 this loop is blue, the rest of the web red) as the first lever is depressed behind by the cam, the first "cast" throws the second lever to the left, and into contact with the second cam, and a second loop is formed, the third lever being thrown into gear; and so on through the series, the size of the meshes are determined by fastening the latter at a greater or less distance from the uprights X, when the sweeps are drawn back. The hooks (*r*) are then detached from the loops, and the web being drawn by the weight (*c'*), the loops are raised above the teeth and the knots tightened; the comb is then brought down, (the teeth on it entering the loops) to the center, under the tongue between the slots; it is then changed to the other side far enough to cast the loops onto the teeth (*s*), and the sweeps are let down, the comb is removed, and the sweeps are cleared from the levers by throwing back the bar N. The twine connected with the spool is cut, and one row of loops and knots is completed; by repeating the operation perfect diamond shaped meshes will be formed, with square flat knots.

What I claim as my invention and desire to secure by Letters Patent, is—

1. The combination of the jaws (*x z*) the gums (*t*) the teeth (*s*) and the hooks (*r*) for forming an open noose, constructed and arranged in the manner set forth.

2. I also claim the combination of the sweeps (*o*) and levers (*l*) for forming the meshes; and in combination therewith the casts (*c*) and cams (*b*) on shaft Y, for moving them in regular succession.

3. I further claim the combination of the lathe, and frame (K, L, *q*,) attached thereto on which the levers and casts are hung, and suspending the latter on levers so as to be raised by a treadle; constructed and arranged for the purpose herein described.

LEVI VAN HOESEN.

Witnesses:
 JOSEPH PARKER,
 M. M. ISHEL.